(12) United States Patent
Carroni et al.

(10) Patent No.: US 10,208,958 B2
(45) Date of Patent: Feb. 19, 2019

(54) METHOD AND GAS TURBINE COMBUSTION SYSTEM FOR SAFELY MIXING H2-RICH FUELS WITH AIR

(71) Applicant: ANSALDO ENERGIA SWITZERLAND AG, Baden (CH)

(72) Inventors: Richard Carroni, Niederrohrdorf (CH); Fernando Biagioli, Fislisbach (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 453 days.

(21) Appl. No.: 14/096,210

(22) Filed: Dec. 4, 2013

(65) Prior Publication Data

US 2014/0123667 A1 May 8, 2014

Related U.S. Application Data

(60) Division of application No. 13/421,299, filed on Mar. 15, 2012, now abandoned, which is a continuation of
(Continued)

(30) Foreign Application Priority Data

Sep. 17, 2009 (EP) .................................... 09170508

(51) Int. Cl.
*F23R 3/28* (2006.01)
*F23L 7/00* (2006.01)
*F02C 3/30* (2006.01)

(52) U.S. Cl.
CPC ............... *F23R 3/286* (2013.01); *F02C 3/30* (2013.01); *F23L 7/00* (2013.01);
(Continued)

(58) Field of Classification Search
CPC ..... F23R 3/286; F02C 3/30; F23L 7/00; F23L 2900/07002; F23C 2900/9901
(Continued)

(56) References Cited

U.S. PATENT DOCUMENTS 3,853,273 A * 12/1974 Bahr .......................... F23R 3/14
239/402
3,982,878 A * 9/1976 Yamane .................. F02B 43/10
60/39.26
(Continued)

FOREIGN PATENT DOCUMENTS

CN 1185561 A 6/1998
CN 101243287 A 8/2008
(Continued)

OTHER PUBLICATIONS

Office Action (Notification of Reasons for Refusal) dated Jun. 16, 2014, in corresponding Japanese Patent Application No. 2012-529203, and an English translation of the Office Action. (4 pgs).
(Continued)

*Primary Examiner* — Ted Kim
(74) *Attorney, Agent, or Firm* — Bucanan Ingersoll & Rooney, PC

(57) ABSTRACT

A method and apparatus are disclosed for mixing H2-rich fuels with air in a gas turbine combustion system, wherein a first stream of burner air and a second stream of a H2-rich fuel are provided. All of the fuel is premixed with a portion of the burner air to produce a pre-premixed fuel/air mixture. This pre-premixed fuel/air mixture is injected into the main burner air stream.

4 Claims, 3 Drawing Sheets

Related U.S. Application Data application No. PCT/EP2010/062807, filed on Sep. 1, 2010.

(52) U.S. Cl.
CPC ............... *F23C 2900/9901* (2013.01); *F23L 2900/07002* (2013.01); *Y02E 20/344* (2013.01)

(58) Field of Classification Search
USPC ..................................... 60/737, 748, 39.465
See application file for complete search history.

(56) References Cited

U.S. PATENT DOCUMENTS

| | | | |
|---|---|---|---|
| 4,419,074 A * | 12/1983 | Schuetz | F23D 14/06 239/403 |
| 4,928,481 A | 5/1990 | Joshi et al. | |
| 4,932,861 A | 6/1990 | Keller et al. | |
| 5,216,876 A | 6/1993 | Gabrielson et al. | |
| 5,377,483 A | 1/1995 | Mowill | |
| 5,421,166 A * | 6/1995 | Allam | F01K 23/068 60/39.12 |
| 5,454,220 A | 10/1995 | Althaus et al. | |
| 5,473,881 A | 12/1995 | Kramnik et al. | |
| 5,569,020 A * | 10/1996 | Griffin | F23C 13/08 60/723 |
| 5,577,904 A * | 11/1996 | Dobbeling | F23D 14/02 431/268 |
| 5,588,826 A | 12/1996 | Dobbeling et al. | |
| 5,673,551 A | 10/1997 | Dobbeling | |
| 5,689,948 A | 11/1997 | Frutschi | |
| 5,784,876 A | 7/1998 | Alkabie | |
| 6,126,439 A | 10/2000 | Knopfel et al. | |
| 6,174,160 B1 | 1/2001 | Lee et al. | |
| 6,179,608 B1 | 1/2001 | Kraemer et al. | |
| 6,202,420 B1 | 3/2001 | Zarzalis et al. | |
| 6,263,676 B1 * | 7/2001 | Keller | F23C 7/002 60/737 |
| 6,460,341 B1 * | 10/2002 | Gutmark | F02C 3/30 60/39.55 |
| 7,162,864 B1 * | 1/2007 | Schefer | F23C 9/00 123/1 A |
| 7,421,844 B2 | 9/2008 | Griffin et al. | |
| 7,426,833 B2 | 9/2008 | Yoshida et al. | |
| 8,057,224 B2 | 11/2011 | Knoepfel | |
| 2002/0063344 A1 * | 5/2002 | Pagade | B01F 5/0614 261/94 |
| 2003/0041588 A1 | 3/2003 | Joos et al. | |
| 2004/0226299 A1 | 11/2004 | Drnevich | |
| 2005/0115244 A1 | 6/2005 | Griffin et al. | |
| 2006/0260316 A1 | 11/2006 | Stuttaford | |
| 2008/0083224 A1 | 4/2008 | Varatharajan et al. | |
| 2008/0092513 A1 * | 4/2008 | Carroni | B01F 5/0453 60/39.23 |
| 2009/0113895 A1 | 5/2009 | Steele et al. | |
| 2009/0123882 A1 * | 5/2009 | Eroglu | F23C 7/002 431/8 |
| 2009/0139242 A1 | 6/2009 | Senior et al. | |
| 2009/0211257 A1 | 8/2009 | Cankovic et al. | |
| 2010/0101229 A1 | 4/2010 | York et al. | |
| 2010/0115960 A1 | 5/2010 | Brautsch et al. | |
| 2010/0146984 A1 | 6/2010 | Carroni et al. | |
| 2010/0170763 A1 | 7/2010 | Lai et al. | |
| 2010/0269507 A1 * | 10/2010 | Khan | F23D 14/24 60/748 |
| 2011/0016871 A1 | 1/2011 | Kraemer et al. | |
| 2011/0056205 A1 | 3/2011 | Carroni et al. | |

FOREIGN PATENT DOCUMENTS

| | | |
|---|---|---|
| EP | 0 321 809 A1 | 6/1989 |
| EP | 0 620 362 A1 | 10/1994 |
| EP | 0 704 657 A2 | 4/1996 |
| EP | 0 731 255 A1 | 9/1996 |
| EP | 0732546 A1 | 9/1996 |
| EP | 0 833 105 A2 | 4/1998 |
| EP | 0 899 438 A1 | 3/1999 |
| EP | 1 990 578 A1 | 11/2008 |
| JP | 60240832 A | 11/1985 |
| JP | 8-145361 A | 6/1996 |
| WO | WO 2008/135362 A1 | 11/2008 |
| WO | WO 2008135362 * | 11/2008 |
| WO | WO 2008/155242 A1 | 12/2008 |
| WO | WO 2009/068427 A1 | 6/2009 |
| WO | WO 2009/109448 A1 | 9/2009 |
| WO | WO 2009/109454 A1 | 9/2009 |

OTHER PUBLICATIONS

Chinese Office Action dated Dec. 4, 2013, issued by the State Intellectual Property Office of the People's Republic of China in corresponding Chinese Patent Application No. 201080038645.4, and English language translation of Office Action. (15 pages).
International Search Report (PCT/ISA/210) dated Oct. 25, 2010, by European Patent Office as the International Searching Authority for International Application No. PCT/EP2010/062807.
Written Opinion (PCT/ISA/237) dated Oct. 25, 2010, by European Patent Office as the International Searching Authority for International Application No. PCT/EP2010/062807.
European Search Report dated Feb. 5, 2010 for Application No. 09170508.7.
Communication dated Jan. 16, 2013 by the European Patent Office in corresponding European Patent Application No. 09 170 508.7.

* cited by examiner

METHOD AND GAS TURBINE COMBUSTION SYSTEM FOR SAFELY MIXING H2-RICH FUELS WITH AIR

RELATED APPLICATION

This application is a divisional of U.S. application Ser. No. 13/421,299, filed Mar. 15, 2012, which claims priority as a continuation application under 35 U.S.C. § 120 to PCT/EP2010/062807, which was filed as an International Application on Sep. 1, 2010, designating the U.S., and which claims priority to European Application 09170508.7 filed in Europe on Sep. 17, 2009.

FIELD

The present disclosure relates to gas turbines, and a method for safely mixing H2-rich fuels with air in a gas turbine combustion system.

BACKGROUND INFORMATION

Known combustors for hydrogen-rich fuels can rely upon very high levels of dilution (with inert species, for example, N2 and/or steam) of diffusion flames. See, for example, WO-A1-2008/135362 or WO-A1-2008/155242. Derating (i.e., reducing flame temperatures) can also be used. See, for example, EP-A1-0 731 255 or EP-A1-0 899 438. Efforts are being made to develop lean-premix combustion systems for hydrogen-rich fuels in order to further reduce emissions and to minimize costly diluents. Such systems can involve a high degree of premixing. Unfortunately, hydrogen-rich fuels can be so reactive that significant modifications may be desired in order to safely and cleanly burn these fuels. The modifications (for example, increasing burner velocity, using very high fuel jet velocities), however, can be incompatible with the specifications of modern gas turbine burners (low burner pressure loss, low fuel pressure loss).

Introducing H2-rich fuels into air in order to attain a good air/fuel mixture prior to combustion can be exemplified by FIG. 1, which shows laminar flame speeds for CH4 (a standard gas turbine fuel) and for various H2/N2 mixtures. H2-rich laminar flame speeds can differ from their CH4 counterparts in that:

The peak flame speed can be at least 6 times higher; the flame speed in the entire range of usable fuel/air mixtures can be higher than for CH4; and the peak flame speed can occur at the much lower air excess factor ($\lambda$) of approx. 0.6, rather than approx. 1.0.

Turbulent burning velocity can largely determine the flame location in a real burner. This parameter can exacerbate the situation for H2-rich fuels, given that the turbulent burning velocity is a function of pressure for H2 but not so for CH4.

When fuel is injected into hot air, the region near the injection point can be characterized by very poor mixing. On a local scale, $\lambda$ can vary between 0 and infinity.

Natural Gas:

The flammability limits can be narrow. On the rich side, a flame cannot be sustained, even at relatively high $\lambda$ ($\approx 0.7$ in FIG. 1). The burning velocity (and hence laminar flame speed) can be low, for example, near the rich extinction limit. The risk of ignition in the injection area can be low, and there can be insufficient anchoring in the event of flashback (i.e., the flame is blown off).

H2-Rich Fuels:

The flammability limits can be wide, with very rich mixtures ($\lambda < 0.3$) capable of sustaining a flame. The burning velocities (and hence laminar flame speeds) can be high. Unfortunately, the peak reactivity of H2-rich fuels can also be in the rich region (for example, around $\lambda = 0.5$), which can mean that the risk of ignition in the injection area can be high, and the flame anchoring (once flame jump occurs) can be very strong. Flashback thus can result in permanent flame anchoring, which can lead to high emissions and possibly also to hardware destruction.

Known methods of dealing with such high burning velocities, and the drawbacks thereof, are listed below.

Utilizing Dilution:

At any given mixing quality, this action can reduce the burning velocity (see dotted double arrow A in FIG. 1) but not sufficiently. Furthermore, this action does not shift the equivalence ratio at which peak burning velocities occur. Excessive dilution can result in high fuel pressure losses and additional costs. The diluent is not free. In the case of N2, its pressure should be increased from that of the air separation unit to that of the fuel. In the case of steam, there is a loss of efficiency associated with extracting steam from the steam cycle.

Significantly increasing the burner air velocity. In order to be effective, the burner velocity should be increased by a suitable amount, thereby resulting in larger pressure losses across the burner and hence reduction in gas turbine efficiency. Furthermore, such high burner velocities can be incompatible with the standard backup fuels (for example, Natural Gas). It is noted that there will be regions of lower air velocity (for example, boundary layers), which are often near those locations from which fuel is injected.

Injecting fuel at higher velocities in order to avoid flame-holding. Excessive jet velocities can cause high-pressure losses in the fuel system, resulting in higher costs. Approaching the sonic limit also poses stability problems.

None of these known methods, however, address the high flammability of very rich fuel/air mixtures.

SUMMARY

A method is disclosed for mixing H2-rich fuels with air in a gas turbine combustion system, comprising providing a first stream of burner air and a second stream of a H2-rich fuel; premixing the fuel with a portion of the burner air to produce a pre-premixed fuel/air mixture; and injecting this pre-premixed fuel/air mixture into a main burner air stream.

A gas turbine combustion system is disclosed comprising: a combustion chamber and at least one burner opening into the combustion chamber for injecting a stream of burner air into the combustion chamber; and at least one pre-premixer for providing a pre-premixed fuel/air mixture, whereby the at least one burner and the at least one pre-premixer are arranged relative to each other, such that the pre-premixed fuel/air mixture will be injected into the stream of burner air during operation.

BRIEF DESCRIPTION OF THE DRAWINGS

The present disclosure is now to be explained more closely by different embodiments and with reference to the attached drawings.

DETAILED DESCRIPTION

Figure 1:
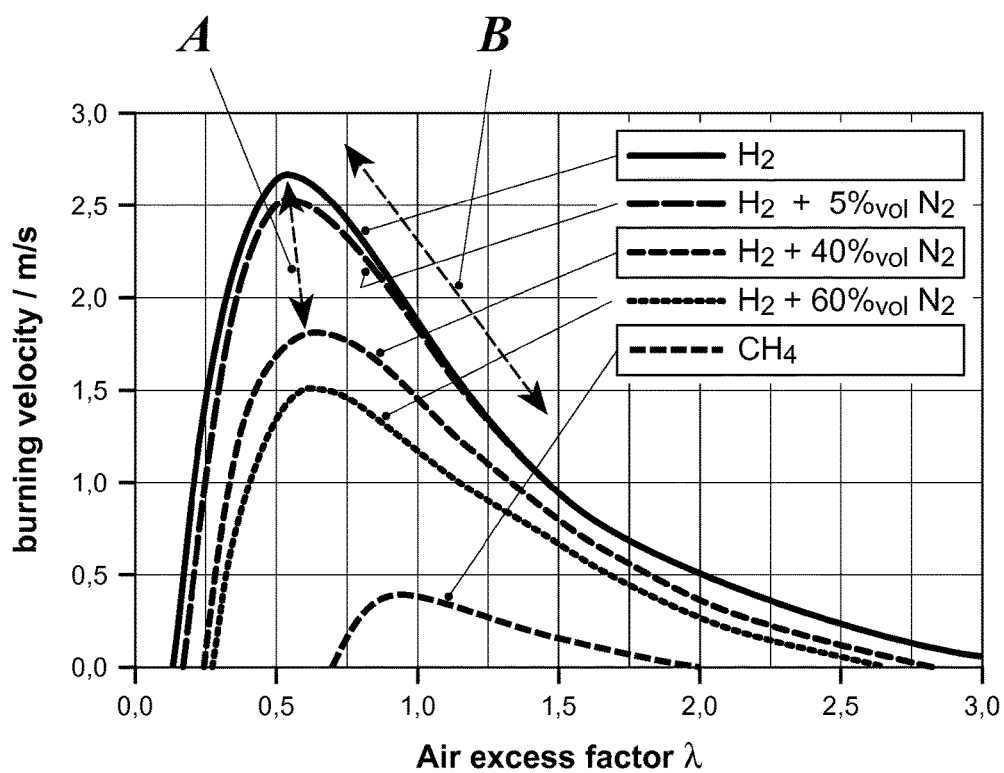
FIG. 1 shows laminar flame speeds for CH4 (a known gas turbine fuel) and for various H2/N2 mixtures at 1 atm and 20° C.

An exemplary embodiment of the disclosure provides a method for safely mixing H2-rich fuels with air in gas turbine combustion systems (e.g., to provide safe mixing), which can effectively permit the local fuel/air mixture to bypass the peak burning velocity (i.e., $\lambda=0.6$) prior to injection into the main burner air stream (known as liner air).

A method according to an exemplary embodiment of the disclosure includes: providing a first stream of burner air and a second stream of a H2-rich fuel, premixing the fuel (e.g., all of the fuel) with a portion of the burner air to produce a pre-premixed fuel/air mixture, and injecting this pre-premixed fuel/air mixture into the main burner air stream.

According to an exemplary embodiment of the disclosure, the premixing can be done in a manner which can prevent flame anchoring at undesired locations, especially near the injection location and in the burner.

According to an exemplary embodiment of the disclosure, an air excess factor of $\lambda>1$, for example, $\lambda>1.3$, can be achieved in the premixing step.

According to an exemplary embodiment of the disclosure, air can be separated into O2 and N2 by an air separation unit (ASU), and a portion of the N2 from the air separation unit (ASU) can be added to the main burner air and/or pre-premixed fuel/air mixture.

According to an exemplary embodiment of the disclosure, a pre-premixer can be in the form of a simple (for example, round) channel with straight or slightly swirling air flow can be used to avoid recirculation and/or stagnation regions.

According to an exemplary embodiment of the disclosure, a pre-premixer including narrow channels whose hydraulic diameter D is less than the quenching distance Q, can be used.

According to an exemplary embodiment of the disclosure, the boundary layers of the air flow in the pre-premixer can be energized, for example, by using some film air, in order to increase velocities in these regions.

According to an exemplary embodiment of the disclosure, the air flow can be additionally accelerated via a "jet-pump" effect of injecting large volumes of H2/N2 fuel.

According to an exemplary embodiment of the disclosure, water mist can be injected into the H2-rich fuel to enhance the safety of the method by the relative cooling due to the subsequent evaporation of the injected water.

According to an exemplary embodiment of the disclosure, a main swirler in a swirl-stabilized burner can be utilized to further increase the velocity in the pre-premixer by taking advantage that the local static pressure in the central region of the burner can be lower than the nominal burner pressure.

A gas turbine combustion system for applying the method according to exemplary embodiments of the disclosure can include a combustion chamber and at least one burner opening into the combustion chamber to inject a stream of burner air into the combustion chamber, at least one pre-premixer for providing a pre-premixed fuel/air mixture, whereby the at least one burner and the at least one pre-premixer can be arranged relative to each other, such that the pre-premixed fuel/air mixture can be injected into the stream of burner air.

According to an exemplary embodiment of the gas turbine combustion system the at least one pre-premixer can have the form of a simple (for example, round), channel with straight or slightly swirling air flow.

According to an exemplary embodiment of the gas turbine combustion system, the at least one pre-premixer can include narrow channels whose hydraulic diameter can be less than a quenching distance.

According to an exemplary embodiment of the gas turbine combustion system, the at least one burner can be a swirl-stabilized burner.

According to an exemplary embodiment of the gas turbine combustion system, the at least one burner can be a so-called Environmental (EV) burner (in place of many: EP 0 321 809 B1) or a so-called Advanced Environmental (AEV) burner (in place of many: EP 0 704 657).

According to an exemplary embodiment of the gas turbine combustion system, the at least one burner can be a so-called Sequential Environmental (SEV) burner (in place of many: EP 0 620 362 B1, pos. 5).

All of these documents mentioned herein relating to EV-, AEV- and SEV-burners and all these developed improvements, patent applications and patents, form an integrating component of this patent application, and incorporated herein by reference in their entireties.

Figure 2:
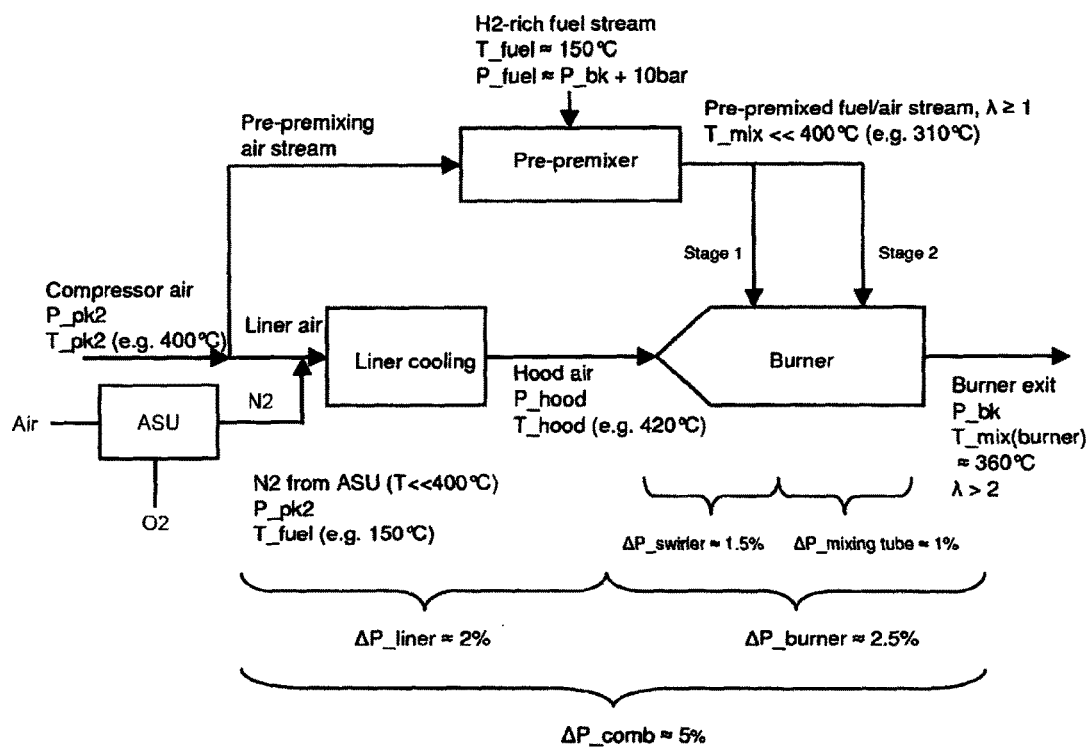
FIG. 2 illustrates a pre-premixing according to an exemplary embodiment of the disclosure.

The exemplary embodiments of the disclosure relate to premixing the fuel with a portion of burner air (denoted as "pre-premixing air") in a manner which can prevent flame anchoring, and then injecting this fuel/air mixture (characterized by $\lambda>1$, for example, $\lambda>1.3$) into the main burner air stream (i.e., the liner air). This can be done in one or more stages. FIG. 2 illustrates an exemplary embodiment of the concept (which is called "pre-premixing"). P_pk2 and T_pk2 are the pressure and temperature, respectively, at a compressor exit of the gas turbine. P_fuel and T_fuel are the pressure and temperature, respectively, of the fuel, T_mix is the temperature of the pre-premixing mixture, while P_hood and T_hood are the pressure and temperature, respectively, of the hood air (which is the air that enters the burner). The pre-premixing method can involve elements of the traditional solutions for H2-rich fuels (for example, high air velocities, high dilution levels), but the negative effects can be rather limited because these methods can apply to a portion of the overall burner air (i.e., the pre-premixing air), rather than the entire burner air flow.

Mass and energy balances show that about 25% and 45% of the total burner air is needed such that the pre-premixed fuel/air has a $\lambda$ of 0.6 and 1.0, respectively, for a 70/30 H2/N2 fuel (air temperature 420° C., fuel temperature 150° C., T_ad=1750K).

In the event that the resulting liner cooling is insufficient (because part of the compressor air was diverted to the pre-premixer), it would be possible to add the remaining N2 from the ASU (air separation unit) to the liner air, the mixture temperature of which would be significantly below the standard liner air temperature of 400° C. This stream of N2 would only have to be compressed from the ASU pressure (approx. 5 bar for a low-pressure device, or 15 bar for a high-pressure ASU) to the P_pk2 pressure (i.e., at compressor exit).

The pre-premixing process is driven by a pressure loss (ΔP) that is larger than that across the burner. FIG. 2—based on a GT13E2 gas turbine of the applicant under full-load conditions for an AEV-125 burner—shows that this pressure loss can be proportional to the sum of the liner and swirler pressure losses, ΔP_liner and ΔP_swirler, amounting to ΔP≈2 to 3%.

Further safety benefits of the pre-premixing concept are noted.

The relatively cold fuel is mixed with only a portion of the entire burner air, meaning that the pre-premixed mixture temperature T_mix is significantly lower (278° C. and 310° C. for λ=0.6 and 1.0, respectively, compared to 350° C. when the fuel is mixed with all the burner air (based on 70/30 H2/N2 at 150° C.). This reduces the reactivity of the air/fuel mixture, thereby greatly assisting the safe transition to λ≥1).

The pre-premixing air stream is cooler than the hood air (by around 20° C.), because it is not used for liner cooling. This can further reduce reactivity in the pre-premixer.

If N2 is used for a part of the pre-premixing air, then the risk of ignition can be reduced due to lower O2; and lower temperature; and the pre-premixed mixture can achieve greater penetration depths in the burner (due to the higher fuel mass flow rates relative to the air mass flow), thereby permitting better mixing than when the non-pre-premixed fuel is injected into the burner.

Several methods of achieving the desired pre-premixing are described below. There are other methods of achieving the proposed idea, which will be apparent to those skilled in the art.

Figure 4:
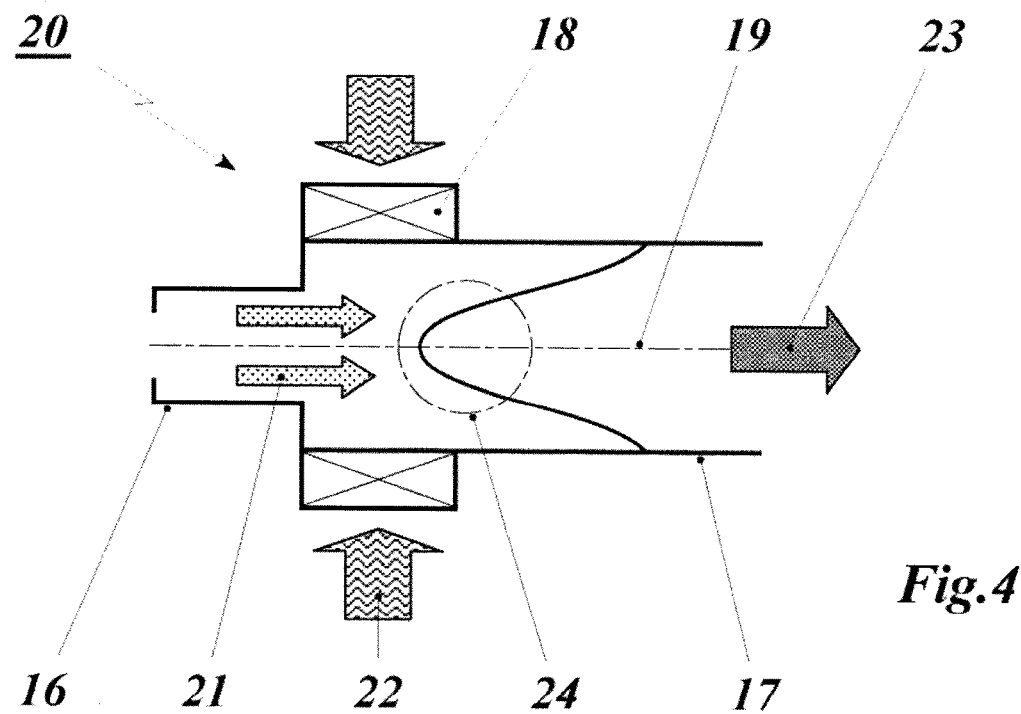
FIG. 4 illustrates an exemplary embodiment of the disclosure wherein a main swirler in a swirl-stabilized burner can be utilized to further increase the velocity in a pre-premixer, by taking advantage that a local static pressure in a central region of the burner is lower than a nominal burner pressure.

The pre-premixer (16 in FIG. 4) can include a simple channel (for example, round) with straight air flow. Aerodynamically simple geometries can avoid recirculation and/or stagnation regions. The boundary layers can be energized (for example, using some film air) in order to increase velocities in these regions. Both jets in cross-flow and co-flowing jets can be used. The latter can further reduce risk of flame anchoring.

Lack of swirl in the pre-premixer means that the air velocity can be around 50% higher than that in the burner (approx 120 m/s), using the given ΔP.

The air flow can additionally be accelerated via the "jet-pump" effect of injecting large volumes of H2/N2 fuel.

The pre-premixer can include small channels whose hydraulic diameter is less than the quenching distance. Injection and pre-mixing of the fuel in these small channels can prevent homogeneous ignition from occurring during the mixing process and prior to the attainment of higher λ. The air velocity can be small, because safety can now be promoted by quenching rather than by convection. Small air velocities in narrow channels are compatible with the available ΔP.

An injection of water into H2-rich fuel and relative cooling by subsequent evaporation would further enhance the safety of the present methodology.

Figure 3:
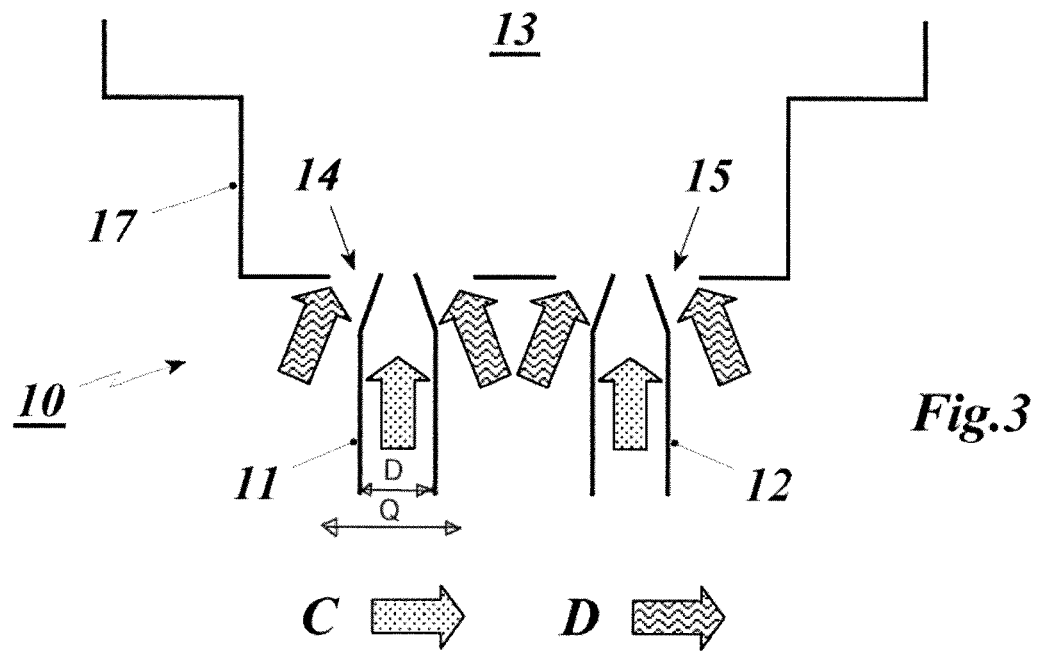
FIG. 3 shows an exemplary embodiment of a burner encompassing a pre-premixing concept according to the disclosure.

FIG. 3 is an example of a burner encompassing the new pre-premixing concept described above. According to FIG. 3, in a combustion system 10, a pre-premixed fuel/air mixture C is injected through pre-premixers 11 and 12 into a burner 17 which opens into a combustion chamber 13. Main air 22 is added through main burner air inlets 14 and 15 near the exit of the pre-premixers 11, 12. The pre-premixing concept can of course be adapted to known burners such as the AEV and also the SEV. For example, see exemplary embodiments below. One or more pre-premixers may be provided per burner.

Embodiment 1

The idea can be used for SEV (i.e. reheat) combustion as well. In this case, the pre-premixer temperature benefit would be even greater since the PK2 air used in the pre-premixer is colder (e.g., 400° C.-450° C.) than the 1000° C. of the main burner air. A similar benefit would be seen in the application to non-reheat lean-premix burners in recuperated combustion systems.

Embodiment 2

Use less air in the pre-premixer. Whilst this gives λ<1, the local mixture temperature in the pre-premixer can be significantly smaller. This can compensate for the higher flame speeds associated with richer fuel/air mixtures. This can also leave more air for liner cooling.

Embodiment 3

The pre-premixing concept can be applied to diffusion burners too. Such a configuration would permit clean and safe operation without derating (diffusion burners often have to run on lower firing temperatures for NOx reasons) and without the need for excessive dilution.

Embodiment 4

The main swirler in a swirl-stabilized burner can be utilized to further increase the velocity (see dotted line B in FIG. 1) in the pre-premixer, simply by taking advantage of the fact that the local static pressure in the central region of the burner is lower than the nominal burner pressure. This is demonstrated in FIG. 4. According to FIG. 4, a combustion system 20 includes a burner 17 with a pre-premixer 16. A pre-premixed fuel/air mixture 21 generated within the pre-premixer 16 enters the burner 17 in an axial direction (axis 19). Main air 22 enters the burner 17 via a hood 18, thereby generating a swirl with a low static pressure region 24. The resulting fully premixed fuel/air mixture 23 exits the burner 17 to enter the subsequent combustion chamber. In general, the main air flow (i.e., "hood" or liner air) can enter the burner via axial, radial or "hybrid" swirlers.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF REFERENCE NUMERALS

10,20 Combustion system
11,12 Pre-premixer
13 Combustion chamber
14,15 Main burner air inlet
16 Pre-premixer
17 Burner
18 Hood
19 Axis
21,C Pre-premixed fuel/air mixture
22,D Main air
23 Fully premixed fuel/air mixture
24 Low static pressure region

What is claimed is:
1. A method for mixing H2-rich fuels with air in a gas turbine combustion system having a combustion chamber with a burner, comprising:

providing a first stream of burner air, branched from a stream of compressor air, and a second stream of a H2-rich fuel, wherein the first stream of burner air is not used for liner cooling;

pre-premixing all of the H2-rich fuel to be injected with the first stream of burner air to produce a pre-premixed fuel/air mixture; and providing a main air stream, taken from the stream of compressor air and used for liner cooling before entering the burner; and in the burner, injecting the pre-premixed fuel/air mixture into the main air stream and premixing the pre-premixed fuel/air mixture and the main air to form a premixture within the burner which enters the combustion chamber;

wherein the pre-premixed fuel/air mixture is injected in an axial direction that is in a cross-flow direction with respect to a direction of injection of the main air stream flow, wherein an air excess factor of A>1, is achieved in the premixing in the burner.

2. The method according to claim 1, wherein the premixing is done in a manner for preventing flame anchoring at undesired locations, including at least one of near an injection location and in the burner.

3. The method according to claim 1, comprising:

separating air into O2 and N2 with an air separation unit; and adding a portion of the N2 from the air separation unit to at least one of the main burner air and the pre-premixed fuel/air mixture.

4. The method according to claim 1, comprising:

using a pre-premixer formed as a channel with straight air flow to avoid at least one of recirculation and stagnation regions to produce the pre-premixed fuel/air mixture.

* * * * *